United States Patent [19]

Lee et al.

[11] Patent Number: 4,721,625

[45] Date of Patent: Jan. 26, 1988

[54] PROCESS FOR PREPARING LOW OIL POTATO CHIPS

[75] Inventors: Yanien Lee, Manlius, N.Y.; Edward E. Bretch; Clifford K. Bath, both of Berwick, Pa.; Carleton G. Merritt, Phoenix, N.Y.

[73] Assignee: Borden, Inc., Columbus, Ohio

[21] Appl. No.: 936,922

[22] Filed: Nov. 28, 1986

Related U.S. Application Data

[63] Continuation of Ser. No. 793,740, Nov. 1, 1985, abandoned, which is a continuation of Ser. No. 568,621, Jan. 6, 1984, abandoned.

[51] Int. Cl.⁴ ............................................. A23L 1/217
[52] U.S. Cl. ...................................................... 426/438
[58] Field of Search ............... 426/241, 242, 243, 637, 426/438, 441, 456, 808

[56] References Cited

U.S. PATENT DOCUMENTS

| | | | |
|---|---|---|---|
| 2,611,705 | 9/1952 | Hendel | 426/438 |
| 3,210,193 | 10/1965 | Martin | 426/438 X |
| 3,436,229 | 4/1969 | Simpson | 426/438 |
| 3,708,311 | 1/1973 | Bolton et al. | 426/438 |
| 4,020,189 | 4/1977 | Wright et al. | 426/438 |
| 4,366,749 | 1/1983 | Caridis et al. | 426/438 X |
| 4,537,786 | 8/1985 | Bernard | 426/438 |

*Primary Examiner*—Arthur L. Corbin
*Attorney, Agent, or Firm*—Robbins & Laramie

[57] ABSTRACT

A process for preparing low fat potato chips comprising frying peeled raw potato chips in oil to produce partially fried potato slices having a moisture content of about 10%–25% by weight, transferring the potatoes directly into a zone in which the potatoes are protected against oxidation, removing the oil from the surfaces of the partially fried potatoes, and drying to a moisture content of 1.5%–3.0%. The product is a shelf stable potato chip having no more than 25% oil, by weight. The equipment used comprises means for transporting partially cooked chips from the fryer, means for blasting the chips with streams of saturated steam that maintain the chips in a dynamic bed, and means for drying said fat-reduced, partially cooked chips to a moisture content of 3% or less by weight.

5 Claims, 6 Drawing Figures

PROCESS FOR PREPARING LOW OIL POTATO CHIPS

This is a continuation of application Ser. No. 793,740, filed Nov. 1, 1985, now abandoned, which is a continuation of Ser. No. 568,621, filed Jan. 6, 1984, now abandoned.

BACKGROUND OF THE INVENTION

This invention relates to the production of potato chips of relatively low oil content and yet which have taste and texture which is indistinguishable from regularly prepared potato chips.

Conventional potato chip products are prepared by the basic steps of slicing peeled raw potatoes and frying them in oil at 350° F. to 380° F. for 2 to 4 minutes, or until a moisture content of approximately 1%–2% by weight is achieved, for example, by frying for 3 minutes at 350° F. The fried chips are then salted and packaged.

The moisture content of raw potato slices normally is from 75% to 85%, depending on environmental growing conditions and varieties. When potato slices are fried in oil at high temperature, this substantial amount of moisture present boils explosively. This results in burst cell walls, and consequently, the formation of capillary holes and voids. Oil adheres to the surfaces of the chips and is also absorbed into the holes and voids in the slices, particularly if they leave the frying oil, are exposed to the atmosphere, and cool, creating a vacuum effect. For these reasons, regular potato chips have high oil contents, ranging from 35% to 39%, and even as high as 42%.

The oil content of potato chips is important for many reasons. Oil is a costly raw material and is an important determinant of chip cost. From the standpoint of good nutrition, it is desirable to maintain a low level of oil in chips. A high oil content not only is costly to the processor but often renders the chips greasy or oily and hence, less desirable to consumers. On the other hand, it is possible to make chips so low in oil that they lack flavor and seem harsh in texture.

Chip producers generally are interested in making acceptable chips of lower oil contents than the 35%–39% norm. A large segment of the population, particularly those of middle age and older, is generally interested in reducing its intake of both fats and calories. Moreover, the relative and absolute size of this segment of the population is increasing.

Accordingly, in recent years the art has begun to recognize the desirability of reducing the oil content of potato chip products from both nutritional and cost standpoints. However, past attempts at producing low oil content chips have not been commercially successful, since any significant reduction in oil content has come at the expense of the desired organoleptic properties, particularly as to taste and texture.

Thus, for example, the process disclosed in U.S. Pat. No. 4,277,510 to Wicklund et al. teaches the reduction of oil content to about 30% by weight by the steps of treating peeled potatoes with boiling water or steam to gelatinize surface starch, cutting the treated potatoes to 0.03–0.1 inch slices having moisture contents about 70%, drying with heated air to an average moisture content of about 30–65% by weight, heating the slices with steam under conditions which prevent substantial rehydration, and then frying in oil to produce chips having an oil content of approximately 30% by weight.

The pre-drying of the product in the Wicklund patent results, however, in a "glassy"-textured, case hardened product which has a raw, green flavor which is different in taste and texture from regularly fried potato chips.

Similarly, processes such as that disclosed in the British Patent Publication No. 1,519,049 of AB Svenska Foodco, which treat potato chips which have been conventionally fried in oil to a moisture content of approximately 2% with superheated steam to remove surface oil, have generally not been successful in reducing the oil content to desired levels while at the same time meeting organoleptic standards.

High moisture content fried potato products, particularly frozen french fried potatoes, have been treated with hot, moist vapor or saturated steam, as in U.S. Pat. No. 3,627,535, of Davidson et al. and U.S. Pat. No. 4,269,861, of Caridis et al., to remove surface oil after frying in a deep oil bath. The french fries are not, however, subjected to drying thereafter since their shelf stability is dependent upon frozen or refrigerated storage prior to serving, rather than upon drying to a shelf stable chip product. Moreover, french fried potato products are obviously substantially different in moisture content, and in texture and taste characteristics, from fried potato chip products.

SUMMARY OF THE INVENTION

In one broad aspect, the invention is a process for preparing potato chips using several steps.

In an initial step of one preferred embodiment of the process, potato slices are fried in oil for a time sufficient to produce partially fried chip slices having a moisture content in the range from about 10% to about 25% by weight. These partially cooked slices are then transferred from the hot oil bath directly into a zone in which the potato slices are protected against oxidation. Preferably this is accomplished by maintaining the zone essentially free of oxygen, under positive pressure.

In this zone, substantially all of the oil is removed from the surfaces of the hot, partially fried chip slices, by the application of jets of saturated steam. Finally, drying of the chip slices is completed, while still in the oxygen-free zone, to reduce their moisture content to the range from about 1.5% to 2%, thus producing a potato chip product having no more than 25% oil by weight. Generally the final drying (cooking) is accomplished by surrounding the chip slices with superheated steam. While at this point the product can be salted and packaged, optionally the texture may be altered by subjecting the chip slices at this time to a very brief, low temperature microwave treatment. This is a particularly useful technique for insuring the complete cooking of "doubles" and "triples", i.e., groups of chips that cling together and that may not be completely cooked by ordinary frying, because of their greater thickness.

In another aspect, this invention relates to a process of treating partially fried conventionally sliced potatoes having a moisture content of about 10% to 25% by weight with saturated steam to remove a significant amount of surface oil from said slices, and then drying the resulting slices with superheated steam or other oxidatively inert gas to the same final moisture content as in regular potato chips i.e. approximately 1.5%–2.0%, to produce a chip product with an oil content of approximately 21%–26% by weight which has the taste and texture of regularly prepared chips having about 35% to 39% oil. The entire process is carried out while the chips are protected against oxidation, preferably by the absence of oxygen.

The process of this invention in a more specific preferred embodiment thereof comprises the steps of cutting peeled potatoes into slices thick enough to be suitable for making potato chips, preferably 0.050–0.075 inches thick; partially frying said potato slices in oil at a temperature in the range of 275° F.–380° F. for a time sufficient to reduce the moisture content of the slices to a range of about 10%–25% by weight and a corresponding absorbed oil content of approximately 20% to no more than 25% by weight based upon the weight of a final dried chip containing 2% moisture; transferring the partially fried slices from the hot oil bath directly into a zone in which an essentially oxygen-free atmosphere is maintained, preferably through the use of a steam atmosphere under positive pressure; contacting the partially fried slices in this zone with a jet or jets of saturated steam to remove from the chips substantially all of the oil on the surface of the chips; then, still in this zone, completing the cooking and drying of the potato slices using superheated steam or a heated oxidatively inert gas, until the final moisture content of the potato slices is less than 3.0% by weight and preferably less than 2% by weight. This process produces chips containing a final oil content of from 20%–25% by weight, and characterized by texture and taste which are indistinguishable from those of regularly fried chips.

The invention also embraces low fat potato chip products produced by the process of the invention.

In addition, the invention also relates to apparatus for producing low fat potato chip products of the invention. Thus, the invention is concerned with apparatus for producing a low fat potato chip product from partially cooked potato slices from a fryer. This apparatus comprises means for transporting a bed of partially cooked chips from the fryer for contact with blasts of saturated steam; means for blasting the bed of chips with streams of saturated steam, that maintain the bed during contact as a dynamic bed, to cause the removal of fat from the partially cooked chips; means for drying the fat-reduced, partially cooked chips to a moisture content of 3% or less by weight; and means for maintaining the chips in an essentially oxygen-free atmosphere in said apparatus. In a preferred embodiment of the apparatus, the means for maintaining the oxygen-free atmosphere comprises means for maintaining in the apparatus an atmosphere of steam that is under positive pressure.

The invention also embraces a potato chip product having a low oil content by weight, that is, no more than 25% by weight of the product, and preferably less. This product nevertheless has flavor and texture equal to those of conventionally fried chips, for example, chips fried at above 300° F. to a moisture content of about 1% by weight.

IN THE DRAWINGS

DETAILED DESCRIPTION OF THE INVENTION

In a preferred embodiment of the invention, the fryer, and all subsequent pieces of equipment used, are shrouded, to exclude the atmosphere, from the initiation of the frying step until the chips have been completely cooked or dried. Shrouding serves a dual purpose. It excludes oxygen, which might react chemically with hot oil, with detrimental effect on taste and shelf stability. In addition, the shrouding contains the desired atmosphere about the chips, which, as will be described, are at an elevated temperature, thus preventing the chips from cooking off and keeping the oil in a condition in which the oil can be easily removed.

Figure 1:
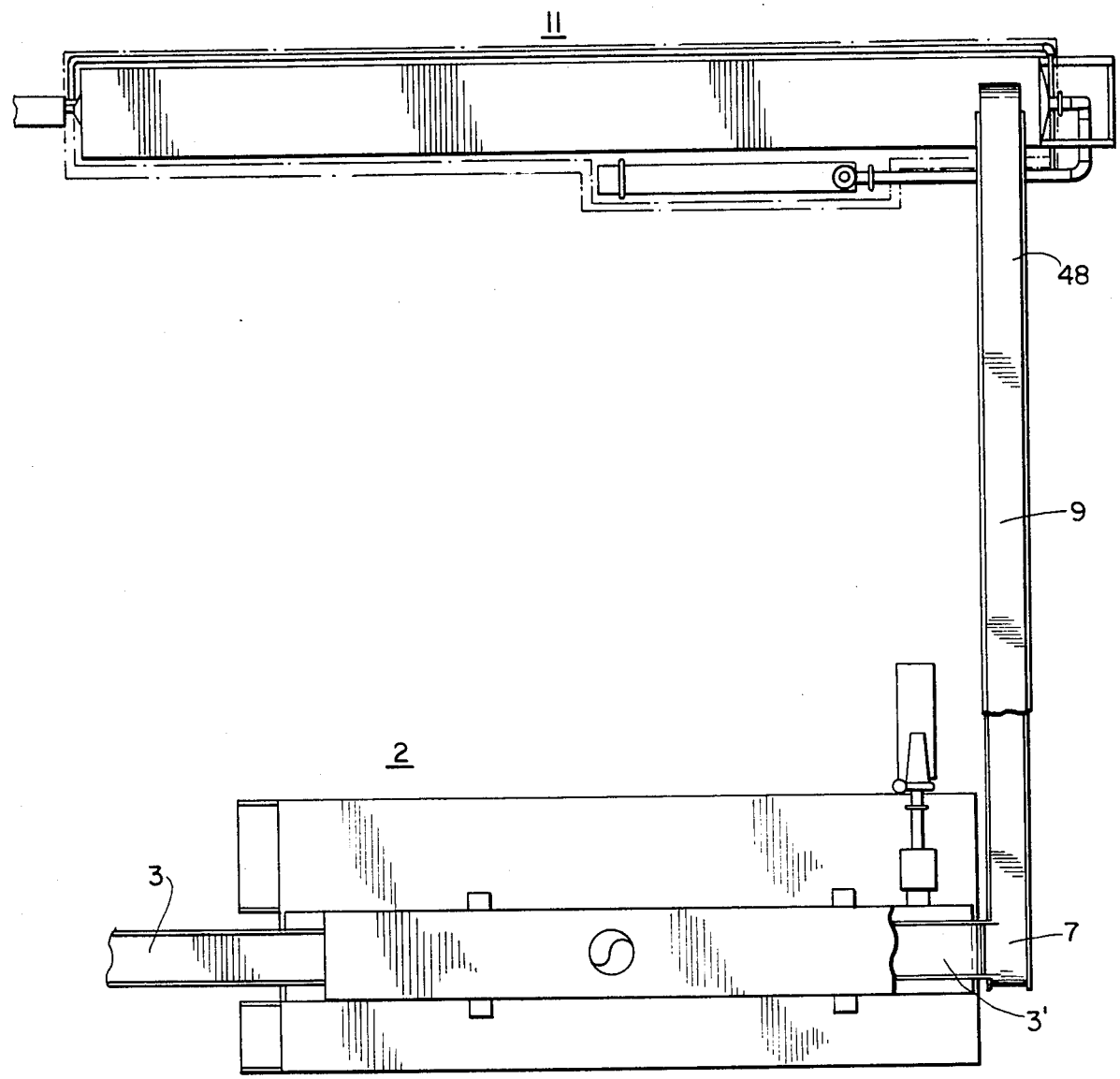
FIG. 1 is a schematic fragmentary diagram, analogous to a top plan view, showing the equipment that can be used to practice the process of the invention, in accordance with one preferred embodiment thereof, including the fryer, saturated steam chamber in which cooking fat is removed, and the drying unit in which cooking is completed and moisture is removed.

Referring now in detail to the drawings, and particularly to FIG. 1, the numeral 2 designates generally a fryer that is designed for use in accordance with one preferred embodiment of this invention. The fryer has a conveyor 3 disposed to bring a supply of raw chips to it for cooking, and internally is equipped with paddles (not shown) to carry the chips through hot cooking oil, following a generally U-shaped path (not shown). During their travel through the fryer, the chips float on the surface of the oil, with the evolution of steam as is customary.

In the fryer, the chips are partially fried. In the process, the chips lose moisture and take on a certain amount of frying oil. It is believed that frying produces a kind of cellular structure in the chips, formed by a puffing process. The voids in the cellular structure tend to act as small reservoirs for oil. Thus the partially fried chips carry surface oil, and as well, some oil in the voids or interstices formed by the frying process.

The partially fried chips are carried out of the fryer 2 by the discharge end 3' of the conveyor 3. They are dropped off onto another, foraminous conveyor 7 (¼ inch holes, preferably) that carries them through the saturated steam chamber 9. Since FIG. 1 is partly broken away, it does not show all of the shrouding that confines the chips to an essentially oxygen-free atmosphere or environment. However, the chips are carried through an essentially oxygen-free environment provided and maintained by shrouding from the time they enter the fryer through the time they are discharged from the drying unit, in the illustrated equipment.

Figure 2:
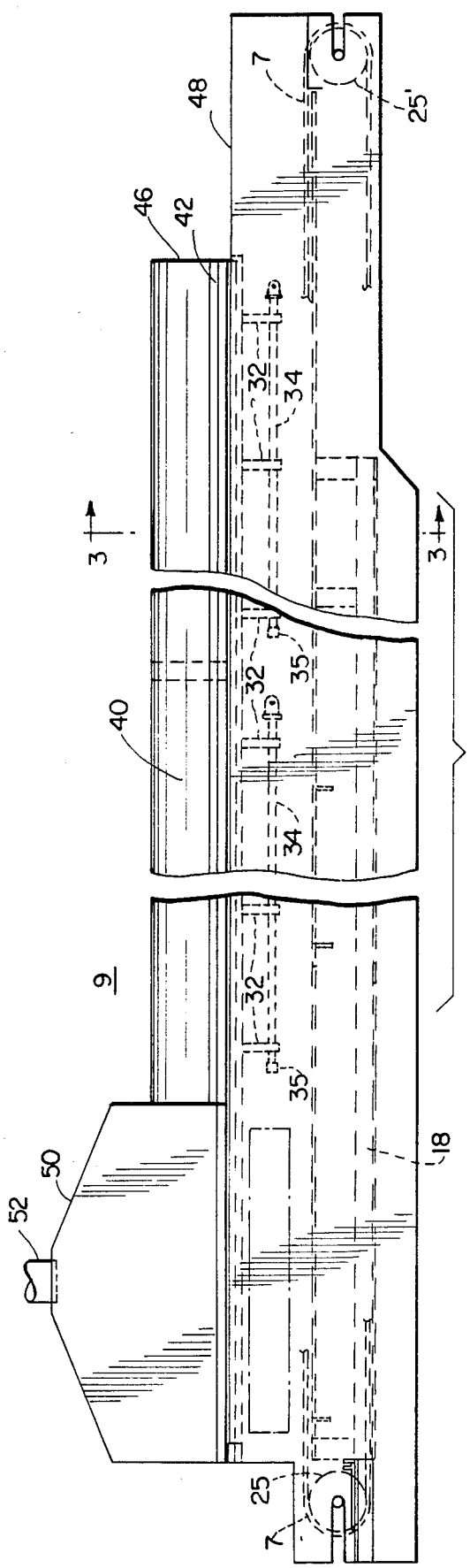
FIG. 2 is a side elevation, partly broken away, or an enlarged scale as compared to FIG. 1, of the saturated steam chamber.
Figure 4:
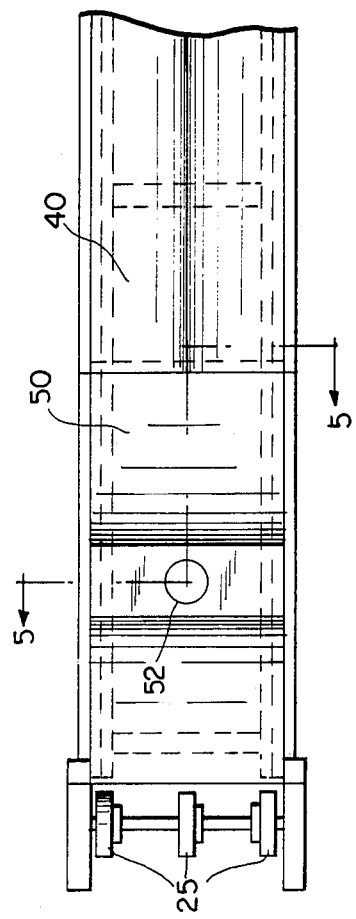
FIG. 4 is a fragmentary top plan view of the end of the saturated steam chamber that is provided with a canopy and vent for leading off spent steam.
Figure 3:
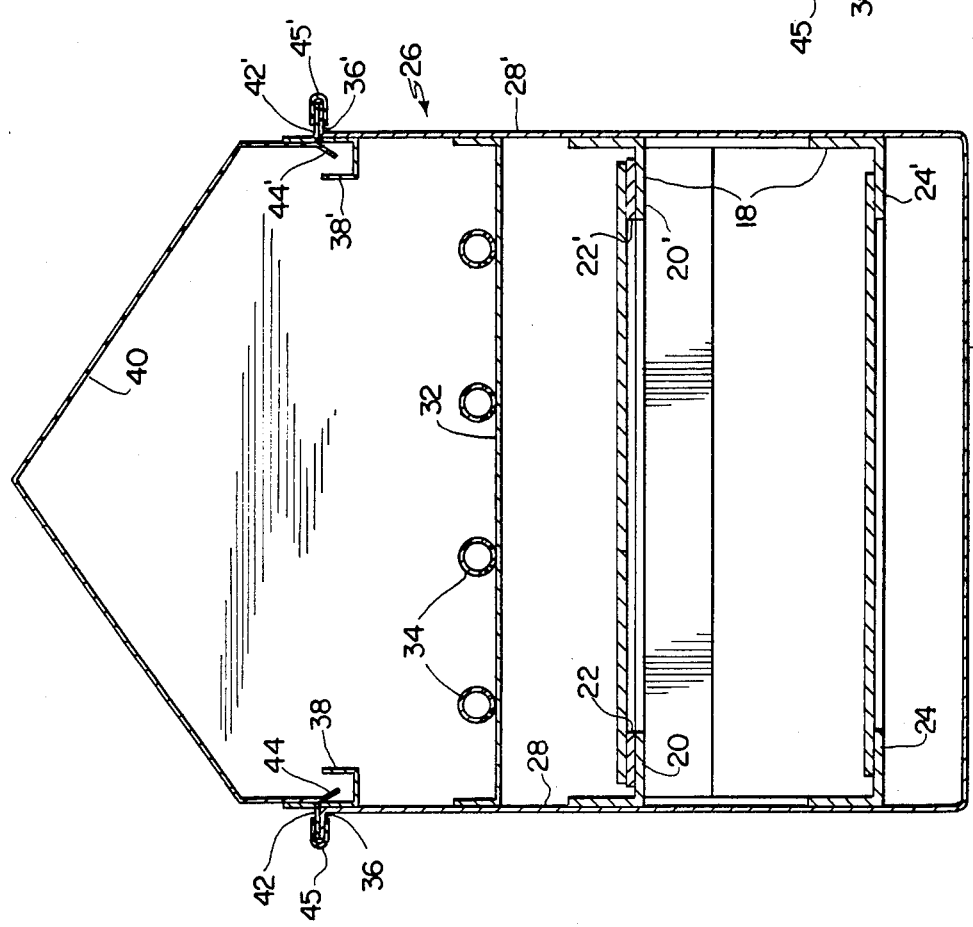
FIG. 3 is a section, on an enlarged scale, taken on the line 3—3 of FIG. 2, looking in the direction of the arrows.

The saturated steam chamber 9 has rigid framing generally denoted by the numeral 18 (FIGS. 2 and 3) supported from a base (not shown). This framing provides within the chamber a pair of opposed, parallel, upper flanges 20, 20', on the upper surfaces of which are disposed wear strips 22, 22', over which the belt of the conveyor 7 slides. The framing also provides lower flanges 24, 24', on which the lower reach of the conveyor belt travels. The pulley wheels 25, 25' over which the conveyor belt travels are mounted at opposite ends of the chamber. A single closure member 26, that is generally U-shaped in transverse section as shown in FIG. 3, provides the side walls 28, 28' and bottom 30 for the chamber 9. It is securely fastened to the framing 18 to enclose the lower part of the chamber. The lower flanges 24, 24', are mounted on the side walls 28, 28' to provide ample clearance for the lower reach of the conveyor belt and also a reservoir for oil removed from the chips.

A plurality (six) of generally U-shaped pipe support straps 32 are disposed at longitudinally spaced intervals along the length of the saturated steam chamber 9, one of these being shown in FIG. 3. Two sets of pipes 34, for applying saturated steam to the chips, are supported on the straps 32. As shown in FIG. 3, these pipes are spaced from each other transversely of the steam chamber. Referring to FIG. 2, the left end of each pipe is closed by a cap 35.

Although not directly shown in the drawings, these pipes are formed with a plurality of lengthwise-spaced small openings, directed downwardly toward the upper reach of the belt of the conveyor 7, to direct jets of saturated steam onto the partially fried chips. Preferably these openings are 3/32 inches in diameter, are spaced 6 inches apart from adjacent openings along the length of a given pipe, and are staggered at a 32° angle from adjacent holes in the same pipe (i.e., as to a vertical plane through the center line of the pipe, the holes are alternately 16° one way, then the other, from the plane). Nozzles may be used for a more controlled steam spray pattern.

The walls 28, 28' are each formed at their upper ends with outwardly directed flanges 36, 36', for a purpose to be described presently. In addition, generally U-shaped trough members 38, 38' respectively, are mounted at the upper end of each of the walls 28, 28', inside the chamber portion, to form alembics. A canopy 40, that has the shape of an inverted cone in transverse section as shown in FIG. 3, is provided with a pair of outwardly directed flanges 42, 42', at its lower end, that seat on the flanges 36, 36' respectively of the wall portions 28, 28'. The opposed lower extremities of the canopy 40 are bent inwardly toward each other as shown in FIG. 3 to form a pair of lips 44, 44' respectively, to guide condensate into the alembics 38, 38'. Clips 45, 45' engage about the end portions of the flanges 36, 42, and 36', 42', respectively.

As best shown in FIG. 2, the canopy 40 provides a protective shroud that encloses the upper end of a major part of the length of the saturated steam chamber. For this purpose, at one of its ends, near the discharge end of the chamber, the canopy is formed with a solid end closure 46, and from there to the discharge end of the chamber, the roof 48 of the chamber is provided by a flat member.

Figure 5:
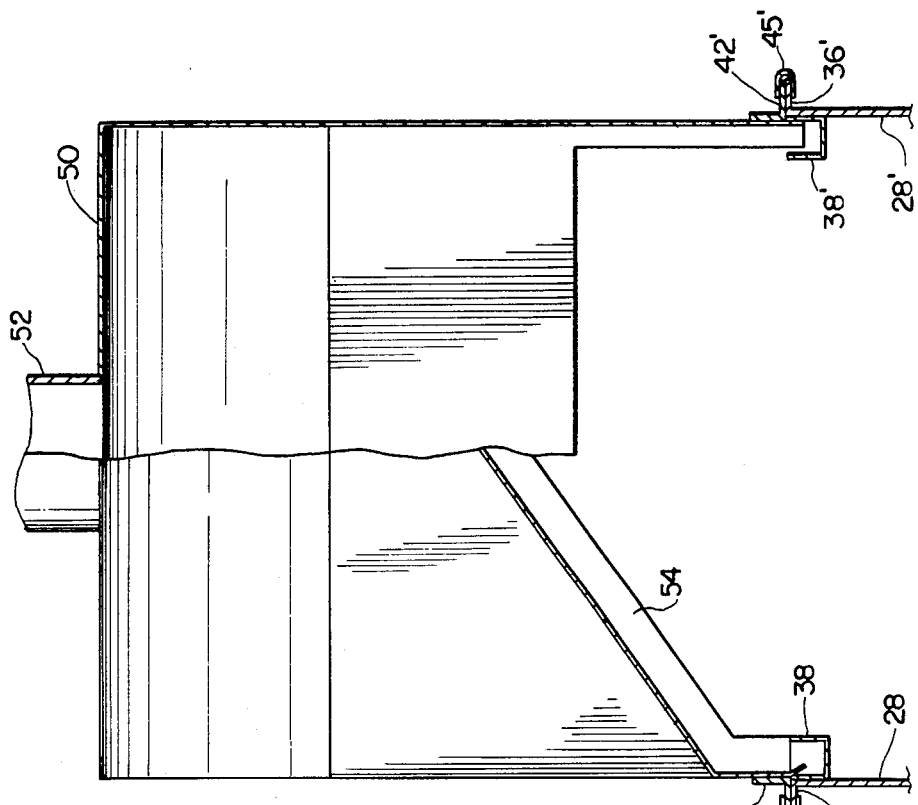
FIG. 5 is a fragmentary section taken on the line 5—5 of FIG. 4, looking in the direction of the arrows.

Adjacent the input end of the saturated steam chamber 9, a raised roof structure 50 is disposed that extends above the level of the canopy 40 to provide a plenum chamber in which spent steam can accumulate. The plenum chamber 50 is provided with a vent 52 at its highest point, as shown in FIGS. 2 and 5, to permit spent steam to be exhausted. The canopy 40 is formed at its end, where it communicates with the plenum chamber, with a reinforcing flange 54 (FIG. 5). During use of the equipment, to prevent the entry of air (oxygen) into the saturated steam chamber, a positive pressure is maintained within the chamber.

There are three conveyors 58, 59, and 60 respectively within the drying unit 11. The conveyors are so arranged as to carry the chips through the drying unit through a zig-zag path, to maintain an appropriate residence time of the chips within the unit. A pair of baffles 61 and 62 are interposed between the adjacent reaches of the three conveyors respectively, to force injected steam to follow an indirect path in the unit before being discharged.

The conveyor 7 of the saturated steam chamber 9 discharges chips from the saturated steam chamber into the drying unit 11, and onto the upper reach of the first, uppermost conveyor belt 58. This conveyor belt 58 is disposed in the upper part of the drying unit 11 and is mounted to discharge chips onto the upper reach of a lower, middle conveyor 59, which in turn is mounted to drop chips onto the upper reach of the lowermost conveyor 60. A paddle-wheel type metering hopper 64 is disposed to receive chips from the lowermost conveyor 60. The paddle-wheel hopper 64 limits the escape of superheated steam from the drying unit, and also limits the possible entrance of air into the drying unit, while moving the fully cooked chips out of the drying unit.

A steam supply line 65 is connected to a superheating device 66 that supplies superheated steam to the drying unit through a plurality of ports 67, 67'. These ports are disposed below the two baffles 61, 62, respectively. A small baffle 68, having generally the shape of an inverted V, is mounted between the inlet ports 67, 67'. Together with the flow of chips cascading down from the discharge end of the conveyor 59, the baffle 68 directs the flow of superheated steam from the inlet 67' to the space between the lengthwise baffle 62 and the upper reach of the conveyor 60. The injected steam from each of the inlet ports 67, 67' thus must travel the length of the drying unit before reversing course to flow back in the reverse direction, to flow over the upper reach of the conveyor 58 in a direction countercurrent to the direction of travel of chips on that conveyor.

The drying unit is provided with a vent 69 through which spent superheated steam may be withdrawn. The vent 69 is located so that injected steam must follow a generally U-shaped (sideways) path in the unit, flowing over one of the two lower conveyors, then back over the uppermost conveyor, before escaping. The spent steam (which may still be superheated) is vented into the saturated steam chamber steam housing 48, entering through the free space about the discharge end of the conveyor screen 7, wherein the spent superheated steam helps maintain the atmosphere of steam throughout said zone. In addition, the drying unit is provided with several normally closed condensate drains 74, 74', to facilitate removal of any condensed steam from the unit. The completely cooked chips from the drying unit are transferred into salting and packaging units (not shown).

The equipment forming the production line shown in the drawings includes only those items that are considered at present to be a part of the invention. Thus conventional equipment would be used for raw potato feed, potato slicing, and washing, to provide raw potato slices for input to the fryer. Similarly, the cooked, low fat potato chips produced by the invention would be passed through a conventional microwave oven, if used, and to conventional salting and packaging equipment.

In practicing the process of this invention, which may be carried out in apparatus other than that just described, raw potatoes are peeled and sliced in the manner conventionally used in the art to produce slices which are of a suitable thickness for processing into potato chips, i.e. a thickness of 0.03 to 0.10 inches and preferably 0.050 to 0.075 inches. The potatoes, and of course the slices cut from them, have a moisture content of from 70% to 90% and more typically 75%-85%, depending upon the variety of potatoes used and the environmental growing conditions. The balance is dry matter.

Optionally, the potatoes can be blanched prior to slicing, but this is not essential to the practice of the process.

The sliced potatoes are partially fried in an oil bath in the fryer, preferably immediately after slicing, at temperatures from 275° F. to 380° F., until the moisture content of the potato slices is reduced to a level of from 10% to no more than about 25% by weight. This range for the moisture content represents average values for a mass of partially fried chips. Moisture content determinations on individual chips may well produce values outside of the stated range, such as values in the range 5% to 30%, but such individual determinations represent extremes. The amount of oil absorbed into the partially fried slices is about 20% to 25%, and preferably a maximum of 23% by weight, which values again represent average values, based upon a final chip product having a moisture content of 2.0%.

The temperature of the oil bath, the dry solids content of the raw potato used, and the moisture content of the partially fried chips, are primary determinants of the required fry time in the oil. Factors that affect the oil content of the partially fried chips include the thickness of the slices, the type of fat used, and any precook-treatment of the slices (none needed for present purposes).

The effects of some of these factors are more clearly shown in the examples below wherein chips from different cultivars having initial dry matter contents ranging respectively from 16.5% to 23.0% were each fried at an oil temperature of 315° F. for long enough periods of time to give an average oil content of 20%-25% (based on a final chip product having 2% moisture). The required fry times can be estimated in advance from the percent dry matter in the raw potato slices.

The moisture content of the partially fried potato chips is critical to the extent that it imparts or contributes to imparting the flavor and texture of conventional potato chips, but with reduced oil absorption. The moisture level should be sufficiently low to permit handling of the partially fried chips during the subsequent processing steps required for the production of a finished product, without the problems of slices sticking together or folding over.

While the frying temperature may be within the range of about 275° F. to 380° F., preferbly it is from about 290° F. to about 330° F., and most preferably, about 315° F. At this most preferred temperature, a frying time of 83 seconds to 115 seconds usually suffices for the removal of 70% to 85% by weight of the moisture initially present. It has been found that when frying temperatures of about 330° F. and higher are used in the initial partial frying step, the final chip products tend to be brittle in texture, while the use of temperatures lower than about 290° F. produces chips which tend to have a glassy texture.

The partially cooked chips are immediately transferred directly into a zone in which an essentially oxygen-free atmosphere is maintained. In a preferred embodiment of the invention, the partially fried chips are moved by an enclosed conveyor out of the oil bath and into this zone, without exposure to the atmosphere.

The essentially oxygen-free zone may comprise sequential but communicating units through which the potato slices are transferred by the enclosed system of conveyors. In a first unit or chamber, the partially cooked slices are subjected to the blasting action of streams of saturated steam, for the removal of surface oil. In a second chamber, the chips are subjected to an environment of superheated steam, which completes the cooking process and reduces the moisture content of the slices further.

Thus, in the saturated steam chamber, in an essentially oxygen-free environment, the partially cooked chips are subjected to the action of jets of high pressure saturated steam, preferably at 40 to 60 psig, and most preferably at 50 psig, for a few (20-30) seconds to remove oil from the surface of the chips. The saturated steam treatment can be performed, for example, by conveying the slices beneath 5/32" openings, about 6 inches apart, set about 3 inches above the slices. While saturated steam at about 50 psig is most preferred, pressures as low as 30 psig or even 15 psig can be used. Pressure higher than 60 psig are useful but are not needed.

The saturated steam treatment results in the removal of from about 5% to 10% by weight of the oil present, based on the weight of the slices, moisture free. That is, the partially cooked chips obtained from 100 lbs. of raw potato slices, upon leaving the hot oil bath, might have the following (averaged) analysis:

TABLE 1

| Analysis: Partially Cooked Slices Leaving Oil Bath | | |
|---|---|---|
| | Lbs. | % |
| dry matter | 15.16 | 58.0 |
| oil | 5.98 | 22.9 |
| water | 5.00 | 19.1 |
| Total | 26.14 | 100.0 |

On a dry basis, the oil content at this point is 28.29%. After 20 to 30 seconds of the saturated steam blast, the chip analysis (averaged) could be:

TABLE 2

| Analysis: Partially Cooked Slices Following Saturated Steam Blast, in lbs. | | |
|---|---|---|
| | Lbs. | % |
| dry matter | 15.16 | 55.6 |
| oil | 4.86 | 17.8 |
| water | 7.23 | 26.5 |
| Total | 27.25 | 99.9 |

On a dry basis, the oil content has been reduced to 24.22%, a reduction of 4.01%. At the same time, the analysis indicates that moisture has been picked up.

The saturated steam blasting process generally results in pick-up of about 5% to 10% moisture by the partially cooked chips due to condensation, to produce a wet surface which inhibits oil penetration and aids oil removal. The steam-blasted, partially cooked chips generally contain 15% to 35% moisture and in the vicinity of 20% oil. A moisture content of 30% is a practical upper limit for the subsequent drying of chips in a bed that is several layers deep.

The reduced oil content slices are then dried (cooked) to a final product moisture content of less than 3.0% and preferably to a moisture content of 1.5%-2.0% by weight. In one preferred embodiment the chips are dried by treatment with superheated steam in the essentially oxygen-free zone. The superheated steam preferably is at a temperature of about 550° F.-600° F. The drying chamber itself should be kept at a temperature of at least about 300° F., to minimize heat loss by the superheated steam. The drying step produces a fully cooked chip which is low in oil and has the texture and flavor of conventionally processed, 35%-39% fat content potato chips.

To insure that any doubles and triples are thoroughly cooked, a brief microwave treatment may be used. Generally radiation at 2450 mH is applied for from 20 seconds to 100 seconds, with a preferred exposure time being 90 seconds.

Figure 6:
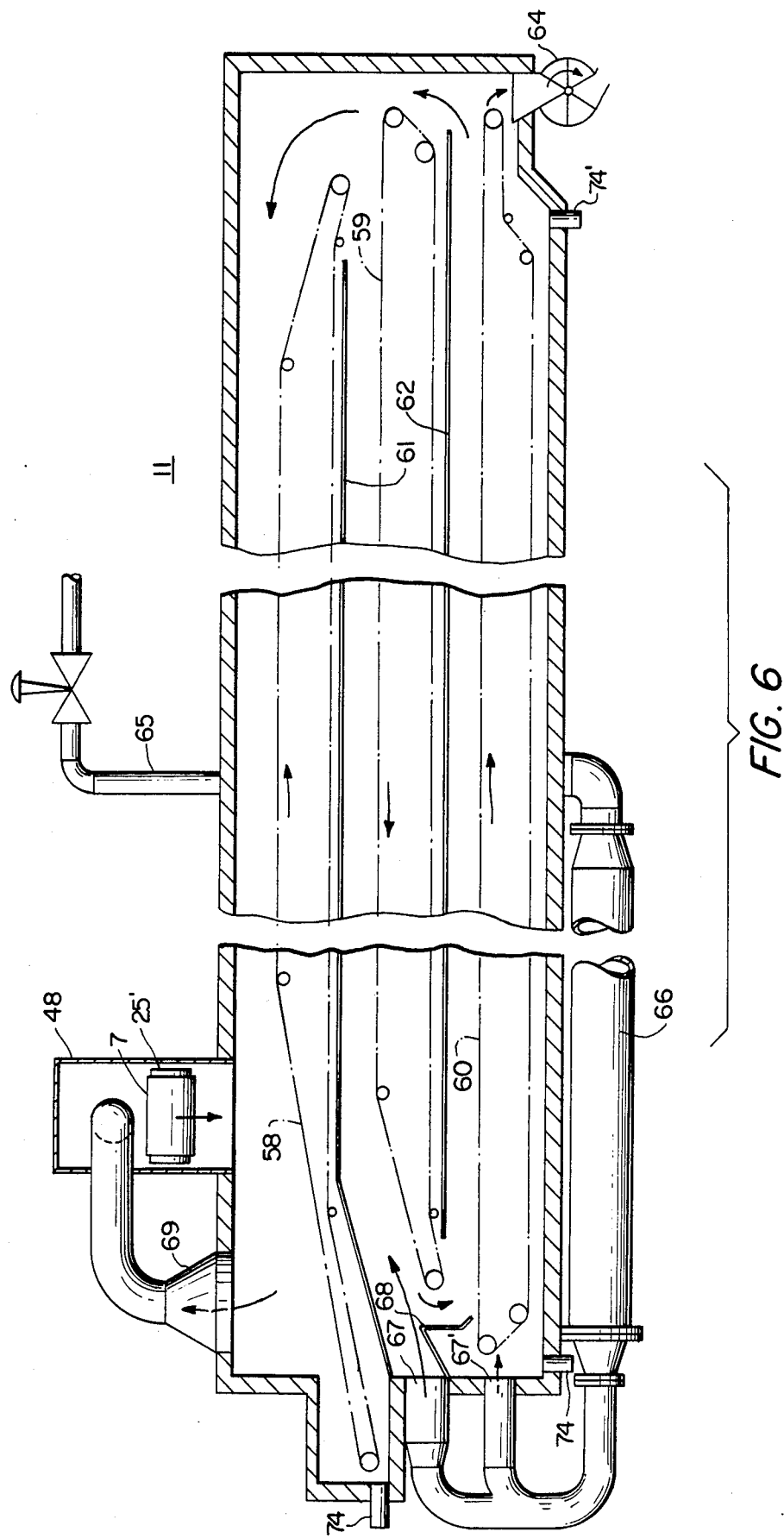
FIG. 6 is a fragmentary side elevation, partly broken away and partly in section, of the drying unit.

In a preferred mode, the superheated steam is passed into the dryer at a point remote from where the partially cooked slices enter the dryer after leaving the saturated steam chamber. In a preferred embodiment of the equipment for practicing the drying step, as shown in the accompanying drawings, the chips follow a zig-zag path, back and forth, within a single enclosure, through the use of multiple, separate conveyor systems. When three conveyor systems are used in a single enclosure, as in FIG. 6, the chips and superheated steam are in countercurrent flow along two conveyor reaches and in cocurrent flow along one conveyor reach. At least a part of the superheated steam flow should be countercurrent to the chip path, preferably. Thus, there should be established a temperature gradient within the dryer, so that the coolest (spent) steam encounters the incoming chips. For optimum results this step of the process is designed to subject the partially cooked slices to a maximum temperature of 450° F. to 500° F., and because of the path followed by the steam and by the slices, to a minimum temperature of about 250° F. to 300° F., with a residence in the superheated steam dryer of 5 to 15 minutes, preferably 6 to 8 minutes, and most preferably about 7 minutes. Spent steam from the dryer passes into the saturated steam chamber and tends to create a temperature gradient in that chamber. The spent steam travels countercurrent to the path of the chips in that chamber, before collecting in the plenum for venting. The spent steam also helps to maintain the essentially oxygen-free atmosphere required in the zone consisting of the saturated steam chamber and the dryer.

Following potato slices from the same 100 lb. batch of slices through a preferred embodiment of the process, following the final cooking in superheated steam, the chips could have the following average analysis:

TABLE 3

| Analysis: Fully Cooked Chips | | |
|---|---|---|
| | Lbs. | % |
| dry matter | 15.16 | 75.1 |
| oil | 4.71 | 23.3 |
| water | 0.31 | 1.5 |
| Total | 20.18 | 99.9 |

At this point, a short, low intensity microwave treatment may be used, optionally, to make the chips more tender. If used, the intensity of heating should be too low and of short duration to promote rancidicity of the oil.

Though other hot drying gas atmospheres can be used in place of the preferred superheated steam, it is essential that the chips be kept hot and be dried under conditions in which the chips are protected against oxidation, preferably by the use of an essentially oxygen-free atmosphere, to avoid accelerated fat oxidation. Heated inert gases such as nitrogen and carbon dioxide could be used for drying, though they are more costly and less readily available than the preferred superheated steam.

Other conventional means such as high frequency microwave cooking may also be used if desired, for drying (final cooking) the low-oil chips of this invention but are less preferred in that superheated steam has been found to give a superior flavor and texture without the tendency for "glassiness" encountered when other conventional drying methods are used. It is a critical feature of this invention, however, that the saturated steam treatment to remove surface oil and the subsequent drying and final cooking be performed under conditions in which the chips are protected against oxidation, preferably by the use of an essentially oxygen free atmosphere, in order to avoid the development of a rancid flavor in the final chip product.

If the fully cooked chips are now salted in the usual manner, the analysis changes slightly as follows:

TABLE 4

| Analysis: Salted Chips | | |
|---|---|---|
| | Lbs. | % |
| dry matter | 15.16 | 74.0 |
| oil | 4.71 | 23.0 |
| salt | 0.31 | 1.5 |
| water | 0.31 | 1.5 |
| Total | 20.49 | 100.0 |

The original 100 lbs. of raw potato slices have thus been converted to 20.49 lbs. of chips of reduced oil content, having flavor and texture comparable to those of conventionally processed potato chips.

For comparison, 100 lbs. of slices of the same kind of raw potatoes would, if cooked and salted in the conventional manner, lead to a product having the following average analysis:

TABLE 5

| Analysis: Salted Chips Processed Conventionally | | |
|---|---|---|
| | Lbs. | % |
| dry matter | 15.16 | 58.3 |
| oil | 10.06 | 38.7 |
| salt | 0.39 | 1.5 |
| water | 0.39 | 1.5 |
| Total | 26.00 | 100.0 |

The conventional process thus produces 26 lbs. of product from the same amount of raw potato input as was used in the description of the present invention. The difference in product weight per 100 lbs. of raw potatoes is primarily in the amounts of oil in the two kinds of chips.

The low-oil chip product of this invention normally has a final moisture content of 1.5%-2.0%, which is essentially the same as that of conventionally prepared potato chips, while having an oil content of only 20%-25% by weight, which is less than two-thirds of the oil content of conventionally prepared potato chips.

Conventional pre-treatment methods, such as gravimetric sorting of the raw potatoes prior to slicing, and potato slice surface modification procedures such as acid or calcium salt treatment to reduce the initial oil content upon frying, can be used in the present invention. Pretreatment of the potato slices with a salt solution allows for longer frying time with more permissible oil pickup, proportionate to the reduction of water content. These pretreatment steps do, however, result in a somewhat inferior chip flavor and texture to that of conventionally fried chips, and their use is therefore not preferred.

On the other hand, partial pre-drying of the potato slices prior to partial frying in the practice of this invention has been found to produce an unacceptable glassy texture, and a flavor which is much inferior to that of conventionally fried potato chips.

A SECOND PREFERRED EMBODIMENT

In another preferred embodiment of this invention, 100 lbs. of a particular lot of potatoes that have been washed and optionally blanched and which have a dry matter content of 15.16 lbs. and 84.84 lbs. water are sliced to a thickness of from 0.050 to 0.075 inches and then fried in oil at 315° F. for 83-115 seconds through a 250 lb./hr. fryer to produce partially fried slices having a moisture content of approximately 23% by weight. The partially fried slices are immediately passed through a saturated steam chamber wherein saturated steam at a pressure of 50 psi is applied, e.g. through sprayers disposed above the chips, to remove from about 5%-10% of what is believed to be the non-absorbed oil. This produces partially cooked slices having an oil content of approximately 18% and a moisture content which has been increased to about 26%-27% by weight due to condensation of the steam on and in the partially cooked slices.

The reduced fat slices are then passed immediately and directly into a superheated steam chamber, typically a multi-path device, using superheated steam prepared from saturated steam that has been superheated to a temperature of approximately 550°-600° F. The chamber itself is kept at a temperature of about 300° F.

The resulting dried, fully cooked chips have an oil content of approximately 23% by weight at a moisture content of about 1.5%. The dried chips can then be passed through a salting section wherein approximately 1.50% salt by weight, based upon the final product weight, is added. The salted chips are then passed through a conventional low-level feeder into a packaging machine to produce approximately 20.5 lbs. of chip product.

The instant invention may be further understood by reference to the following examples which are meant to be illustrative and are not to be construed as limiting the scope of the instant invention as defined by the appended claims. Throughout these examples, and elsewhere in this application, all parts and percentages are by weight, and all temperatures are degrees Fahrenheit, unless expressly stated otherwise.

EXAMPLES 1-9

Examples 1-9 are calculated examples that illustrate the frying step of the invention, which produces partially cooked potato slices ready for further processing to remove surface oil. In these calculated examples, several different varieties of peeled raw potatoes, having dry matter contents respectively of from 16.5%-23.0% by weight, are used as models for estimating the necessary respective dwell times required at an oil bath temperature of 315° F. to produce partially cooked potato slices useful in the practice of the invention. The dwell period estimates are based on the respective dry matter contents of the several cultivars, respectively.

TABLE 6

Estimated fry times, at 315° F. fry temperature, to achieve a 23% oil content (at 2.0% moisture basis) in the final product

| Exp. No. | Potato Variety | % Dry Matter | Fry Temp °F. | Estimated Fry Time, Seconds | Projected Contents of Partially Fried Chips | | Calculated % Oil in Fully Cooked Chips, at 2.0% Moisture |
|---|---|---|---|---|---|---|---|
| | | | | | % Oil | % Moisture | |
| 1 | Belchip | 22.0 | 315 | 110 | 19.10 | 22.0 | 24.0 |
| 2 | Atlantic | 21.0 | 315 | 105 | 15.60 | 20.8 | 19.3 |
| 3 | Chip Belle | 23.0 | 315 | 115 | 17.30 | 17.3 | 20.5 |
| 4 | Norchip | 22.4 | 315 | 112 | 15.16 | 23.0 | 19.3 |
| 5 | Rosa | 19.9 | 315 | 100 | 16.13 | 26.5 | 21.5 |
| 6 | Monona | 16.5 | 315 | 83 | 13.81 | 34.0 | 20.5 |
| 7 | Penn 71 | 19.0 | 315 | 95 | 14.82 | 26.3 | 19.7 |
| 8 | Kennebec | 19.1 | 315 | 96 | 13.88 | 31.3 | 19.8 |
| 9 | Denali | 20.8 | 315 | 104 | 16.24 | 22.0 | 20.4 |

EXAMPLES 10-16

Based on the estimates reported in Examples 1-9, raw potato slices were prepared from several different cultivars, for use in the process of the present invention. Thus, the raw potatoes were washed and sliced to thicknesses of from 0.050-0.075 inches. These slices were then fried in bulk in an oil bath at 315° F. fry temperature. Frying times of different lengths were used, based on the estimates indicated in Table 6 above, to produce in each batch of chips an approximate oil content of 23% (actual range, about 20%-24%) based upon a final chip product containing 2% moisture.

TABLE 7

Experimental results for partially fried chips, using fry times based on those estimated in Table 1 for 315° F. fry temperature

| Exp No. | Potato Variety | % Dry Matter | Fry Temp. °F. | Actual Fry Time Used, Seconds | Analysis of Partially Fried Chips, as is | | Actual % Oil in Fully Cooked Chips, at 2.0% Moisture |
|---|---|---|---|---|---|---|---|
| | | | | | % Oil | % Moisture | |
| 10 | Monona | 16.1 | 315 | 80 | 11.65 | 43.74 | 20.30 |
| 11 | Kennebec | 19.0 | 315 | 95 | 15.91 | 28.01 | 21.68 |
| 12 | Penn 71 | 19.0 | 315 | 95 | 17.06 | 26.98 | 22.89 |
| 13 | Norchip | 19.7 | 315 | 98 | 15.91 | 27.36 | 21.46 |

TABLE 7-continued

Experimental results for partially fried chips,
using fry times based on those estimated in Table 1 for 315° F. fry temperature

| Exp No. | Potato Variety | % Dry Matter | Fry Temp. °F. | Actual Fry Time Used, Seconds | Analysis of Partially Fried Chips, as is | | Actual % Oil in Fully Cooked Chips, at 2.0% Moisture |
|---|---|---|---|---|---|---|---|
| | | | | | % Oil | % Moisture | |
| 14 | Denali | 20.8 | 315 | 104 | 17.12 | 18.74 | 20.65 |
| 15 | Fla Atlantic | 19.5 | 315 | 97 | 19.43 | 21.19 | 24.17 |
| 16 | Belchip | 20.6 | 315 | 103 | 18.25 | 21.12 | 22.67 |

EXAMPLES 17–21

The chip manufacturing process of the invention was carried out by equipment of the kind shown in the drawings and described above, and in accordance with a preferred embodiment of the process. The analytical results recorded for the finished products are reported in Table 8 below.

TABLE 8

Analytical results of finished products prepared by using the instant process

| Exp. No. | Potato Variety | % Dry Matter | Temp. °F. | Time, Seconds | Finished Product | |
|---|---|---|---|---|---|---|
| | | | | | % Oil | % Moisture |
| 17 | NY Monona | 16.7 | 315 | 90 | 24.9 | 1.85 |
| 18 | Mich Denali | 20.8 | 315 | 110 | 20.81 | 1.96 |
| 19 | Mich Denali | 20.8 | 350 | 70 | 23.92 | 1.06 |
| 20 | Canada Kennebec | 21.8 | 315 | 110 | 21.73 | 2.05 |
| 21 | Fla Sebago | 15.6 | 315 | 90 | 23.26 | 1.52 |

General

Referring to the equipment shown in the drawings and described above, observations were made as to the amounts of air and oxygen in the overhead within the equipment, at different times. The results are reported in Table 9 below.

TABLE 9

Amounts of air and of oxygen ($O_2$) inside the saturated steam and superheated steam units.

| Hours in Operation | Saturated Steam Unit | | Superheated Steam Unit | |
|---|---|---|---|---|
| | ppm Air | ppm $O_2$ | ppm Air | ppm $O_2$ |
| up to 2 | 747 | 147 | 1496 | 298 |
| 2–4 | 654 | 129 | 1097 | 217 |
| 4–6 | — | — | 1236 | 242 |

These reported amounts demonstrate that these units, during operation, present an atmosphere or environment that is essentially oxygen-free.

EXAMPLE 22

Modified Embodiment of the Chip Manufacturing Process

Potato slices having thicknesses from 0.050 inches to 0.075 inches were fried in hot oil to reduce the moisture content to less than 15%, but above 3% by weight. These partially fried potato slices were immediately transferred from the hot oil bath into a perforated reel tumbler, which was covered.

Throughout the transfer of the partially cooked slices into the reel tumbler, and their residence in the tumbler, the partially cooked slices were maintained in an essentially oxygen-free atmosphere. This was accomplished by maintaining the perforated reel tumbler under a cover, and continuously injecting saturated steam into the tumbler prior to its use for a period of time sufficient to drive off all of the air and oxygen present, and to maintain an atmosphere of saturated steam in the tumbler. The tumbler was rotated at about 10 rpm, while high pressure saturated steam was sprayed onto the partially cooked potato slices from a distance of 6 inches to 10 inches. The steam spray was applied immediately after the chips left the oil bath and was continued for several seconds, to remove oil on the surfaces of the partially cooked slices.

While the partially cooked slices were subjected to the jets of saturated steam, the chips picked up from 5% to 10% moisture, believed to be caused by condensation of steam on the potato slices. The slices leaving the reel tumbler ordinarily contained from 10% to 25% moisture.

The potato slices, now freed from surface oil, were placed in a conventional drying oven at once, and dried at temperatures in the range from 220° F. to 350° F., depending upon the batch. In each case the moisture content was reduced to less than 2%, or alternatively, a desirable brown color was developed. The fully cooked potato chips contained oil in the range from 21% to 26% approximately, and each bath of fully cooked chips had the taste and texture of conventionally cooked potato chips.

Table 10 below reports the results of the practice of this embodiment of the invention, on several different batches of potato slices. Shelf stability test on these low oil potato chip products, reported in Table 10 below, were comparable with the shelf stability of conventionally cooked potato chips.

TABLE 10

Oil and moisture contents of potato chips with and without surface oil removal

| | Partial Frying Conditions | | | Actual Analysis of the Fully Fried Slices | | Calculated Oil Content of Fully Cooked |
|---|---|---|---|---|---|---|
| Ex. No. | Oil Temp. °F. | Dwell Time Sec. | Surface Oil Removal Treatment | Oil Content % | Moisture % | Chips at 1.5% Moisture |
| A-1 | 275 | 210 | Control | 24.8 | 8.62 | 26.73 |

TABLE 10-continued
Oil and moisture contents of potato chips with and without surface oil removal

| Ex. No. | Partial Frying Conditions | | Surface Oil Removal Treatment | Actual Analysis of the Fully Fried Slices | | Calculated Oil Content of Fully Cooked Chips at 1.5% Moisture |
|---|---|---|---|---|---|---|
| | Oil Temp. °F. | Dwell Time Sec. | | Oil Content % | Moisture % | |
| A-2 | 275 | 210 | w/steam 40 psi, 1 min. | 22.2 | 1.54 | 22.16 |
| B-1 | 275 | 270 | Control | 25.7 | 4.48 | 26.50 |
| B-2 | 275 | 270 | w/steam 40 psi, 1 min. | 21.2 | 1.42 | 21.16 |
| C-1 | 300 | 210 | Control | 30.2 | 4.74 | 31.20 |
| C-2 | 300 | 210 | w/steam 15 psi, 1 min. | 26.8 | 1.18 | 26.7 |
| C-3 | 300 | 210 | w/steam 40 psi, 1 min. | 24.2 | 2.69 | 24.48 |
| C-4 | 300 | 210 | w/steam 50 psi, 1 min. | 21.2 | 1.15 | 21.10 |
| D-1 | 350 | 120 | Control | 29.78 | 5.51 | 31.10 |
| D-2 | 350 | 120 | w/steam 40 psi, 1 min. | 24.8 | 3.88 | 25.40 |
| D-3 | 350 | 90 | w/steam 40 psi, 1 min. | 25.6 | 3.17 | 26.1 |

Conclusion

Generally, the embodiment of the process of the invention described in connection with Examples 1–21 is preferred, because of the use of the essentially oxygen-free atmosphere until the chips are fully cooked. However, the modified embodiment of the invention employed in connection with Example 22, while less preferred, is useful. Both techniques remove surface oil and, it is believed, interstitial oil as well. Once the oil has been removed from the partially cooked chips, there is very little deleterious effect on the chips if they are exposed to the atmosphere, particularly if it is only for a short time, prior to the final cooking operation. However, the use of an essentially oxygen-free environment throughout is preferred.

The equipment illustrated in the drawings maintains an essentially oxygen-free atmosphere without difficulty, i.e., an atmosphere containing a maximum of 300 ppm of oxygen. The cooker generates steam, which maintains a positive pressure above the hot oil bath. The two steam chambers are also maintained with a steam atmosphere under positive pressure. The shrouding excludes air and permits some intercommunication between the atmospheres in the several different pieces of equipment. The protection of the chips against oxidation in this way makes it possible to produce chips that are free of antioxidant additives. However, similar results are obtained by adding one or more antioxidants to the cooking oil, although even in such a case, the maintenance of an oxygen-free atmosphere is preferred. Suitable antioxidants include t-butyl hydroquinone and butyl hydroxy anisole.

In both process embodiments described above in detail, a microwave treatment as a final processing step may be desirable to adjust the texture and/or to insure that doubles, triples, and other aggregates are fully cooked. While the invention has been described in detail in connection with the production of fully cooked chips that ordinarily are salted, the invention is equally applicable to the production of specially flavored chips such as, for example, barbeque flavored chips, salt and vinegar flavored chips, onion and sour cream flavored chips and the like.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A process for preparing potato chips consisting esentially of:
   (a) in a partial frying step, frying peeled potato slices, having a thickness suitable for making potato chips, in hot oil at a temperature of about 290° F. to 330° F. for a time sufficient to produce partially fried potato slices having an average moisture content of 10% to 25% by weight, and an oil content, based on the weight of the slices when dried to a moisture content of 2% by weight, of less than about 25% by weight;
   (b) transferring the partially fried potato slices from the hot oil directly into an essentially oxygen-free zone without exposure to the atmosphere;
   (c) in said zone removing substantially all of the oil from the surfaces of said partially fried slices by blasts of saturated steam; and
   (d) while still in said zone, drying the resulting potato slices in an atmosphere of superheated steam, to reduce their moisture content to about 1.5% to 2.0%, to produce a fully cooked potato chip product having no more than about 23% oil by weight, in the unsalted state.

2. The process of claim 1 wherein a steam atmosphere is maintained in said essentially oxygen-free zone under a positive steam pressure, and wherein said steam blasts are directed at said partially fried slices while they are still hot.

3. The process of claim 2 wherein said blasts of saturated steam are provided from a steam supply under a pressure of 15 psig to 60 psig, to remove from 5% to 10% of the oil present from said partially fried slices.

4. The process of claim 2 wherein said essentially oxygen-free zone has an oxygen content of not more than 300 ppm.

5. The process of claim 4 wherein said chips are transported in said zone in a bed that, when subjected to said blasts of steam, is a dynamic bed, and wherein in said drying step (d), said superheated steam and said potato slices travel, at least in part, through countercurrent paths, and wherein spent superheated steam is used to help maintain the atmosphere of steam in said zone.

* * * * *